United States Patent
Wang

(10) Patent No.: US 10,394,090 B2
(45) Date of Patent: Aug. 27, 2019

(54) DISPLAY PANEL AND MANUFACTURE METHOD THEREOF, DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Yan Wang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/067,987

(22) PCT Filed: Aug. 7, 2017

(86) PCT No.: PCT/CN2017/096205
§ 371 (c)(1),
(2) Date: Jul. 3, 2018

(87) PCT Pub. No.: WO2018/099122
PCT Pub. Date: Jun. 7, 2018

(65) Prior Publication Data
US 2019/0011788 A1     Jan. 10, 2019

(30) Foreign Application Priority Data

Dec. 1, 2016 (CN) .......................... 2016 1 1091735

(51) Int. Cl.
*G02F 1/1343* (2006.01)
*G02F 1/1339* (2006.01)

(52) U.S. Cl.
CPC ...... *G02F 1/134309* (2013.01); *G02F 1/1339* (2013.01); *G02F 1/13394* (2013.01);
(Continued)

(58) Field of Classification Search
CPC ..................................................... G02F 1/1343
See application file for complete search history.

(56) References Cited

U.S. PATENT DOCUMENTS

| 2012/0147306 A1* | 6/2012 | Moriya | ............. G02F 1/133555 349/113 |
| 2013/0250195 A1* | 9/2013 | Koito | .................... G02F 1/1313 349/15 |
| 2015/0098048 A1* | 4/2015 | Tomioka | ........... G02F 1/133512 349/106 |

FOREIGN PATENT DOCUMENTS

| CN | 103323980 A | 9/2013 |
| CN | 102822732 B | 11/2015 |

(Continued)

OTHER PUBLICATIONS

The International Search Report and Written Opinion dated Oct. 26, 2017; PCT/CN2017/096205.

*Primary Examiner* — Sang V Nguyen
(74) *Attorney, Agent, or Firm* — Ladas & Parry LLP

(57) ABSTRACT

A display panel and a manufacture method thereof, a display device. The display panel is divided into a plurality of sub-pixel units, and includes: a first substrate and a second substrate arranged opposite to each other, a plurality of main spacers that are arranged between the first substrate and the second substrate to support the first substrate and the second substrate, the plurality of sub-pixel units include a plurality of first sub-pixel units and a plurality of second sub-pixel units, the plurality of first sub-pixel units are adjacent to any one of the plurality of main spacers and are arranged in a single-domain structure, and the plurality of second sub-
(Continued)

pixel units are not adjacent to any one of the plurality of main spacers and are arranged in a multi-domain structure.

19 Claims, 5 Drawing Sheets

(52) U.S. Cl.
CPC .. *G02F 1/134336* (2013.01); *G02F 1/134363* (2013.01); *G02F 2001/13396* (2013.01); *G02F 2001/134318* (2013.01); *G02F 2001/134345* (2013.01); *G02F 2001/134372* (2013.01); *G02F 2201/121* (2013.01); *G02F 2201/122* (2013.01); *G02F 2201/123* (2013.01)

(56) References Cited

FOREIGN PATENT DOCUMENTS

| | | |
|---|---|---|
| CN | 105807484 A | 7/2016 |
| CN | 105866995 A | 8/2016 |
| CN | 106526990 A | 3/2017 |
| CN | 206224975 U | 6/2017 |

* cited by examiner

DISPLAY PANEL AND MANUFACTURE METHOD THEREOF, DISPLAY DEVICE

TECHNICAL FIELD

Embodiments of the present disclosure relate to a display panel and a manufacture method thereof, a display device.

BACKGROUND

With the continuous development of liquid crystal display technology, a liquid crystal display with a higher aperture ratio and a wider viewing angle have attracted more and more people's attention. In order to further improve the display performance, the current liquid crystal display usually adopts a double-domain or a single-domain pixel array structure.

In a liquid crystal display that adopts a single-domain pixel, tilt directions of pixel electrodes are the same, and the light transmittance of the liquid crystal display with such a pixel structure is relatively high. For a liquid crystal display that adopts a double-domain pixel, for example, an upper half and an lower half of a pixel electrode in each pixel unit are in a symmetrical tilt structure, and in the power-on state, liquid crystal molecules in the upper half region and liquid crystal molecules in the lower half region possess opposite tilt angles, that is, there are two different liquid crystal domains in a single pixel region, compared with the single-domain pixel, this pixel structure can have a higher contrast and a wider viewing angle range.

SUMMARY

At least one embodiment of the present disclosure provides a display panel, the display panel is divided into a plurality of sub-pixel units, and comprises: a first substrate and a second substrate, arranged opposite to each other; a plurality of main spacers, arranged between the first substrate and the second substrate to support the first substrate and the second substrate, wherein the plurality of sub-pixel units comprise a plurality of first sub-pixel units and a plurality of second sub-pixel units, the plurality of first sub-pixel units are adjacent to any one of the main spacers and are arranged in a single-domain structure, and the plurality of second sub-pixel units are not adjacent to any one of the main spacers and are arranged in a multi-domain structure.

For example, in the display panel provided by at least one embodiment of the present disclosure, the first sub-pixel unit comprises a first electrode that is arranged on the second substrate, the first electrode comprises slits that extend in a same direction, and the second sub-pixel unit comprises a second electrode that is arranged on the second substrate, the second electrode comprises at least two slits that extend in different directions.

For example, in the display panel provided by at least one embodiment of the present disclosure, the second electrode is in a double-domain structure, the second electrode comprises a first slit that extends in a first direction and a second slit that extends in a second direction, an angle formed by the first direction and a row direction of the sub-pixel unit is equal or unequal to an angle formed by the second direction and the row direction of the sub-pixel unit.

For example, in the display panel provided by at least one embodiment of the present disclosure, the angle formed by the first direction and the row direction of the sub-pixel unit is in a range of 70°-85°.

For example, in the display panel provided by at least one embodiment of the present disclosure, the first sub-pixel unit further comprises a third electrode that is arranged on the second substrate; and the second sub-pixel unit further comprises a fourth electrode that is arranged on the second substrate.

For example, in the display panel provided by at least one embodiment of the present disclosure, the first electrode and the second electrode are pixel electrodes, the third electrode and the fourth electrode are common electrodes; or, the first electrode and the second electrode are the common electrodes, and the third electrode and the fourth electrode are the pixel electrodes.

For example, in the display panel provided by at least one embodiment of the present disclosure, the plurality of main spacers are periodically arranged.

For example, at least one embodiment of the present disclosure provides a display panel, the display panel further comprises a plurality of auxiliary spacers that are spaced apart from the main spacers, and a height of the auxiliary spacer is lower than a height of the main spacer.

For example, in the display panel provided by at least one embodiment of the present disclosure, a color filter layer and a black matrix are further arranged on the first substrate, the plurality of the main spacers are arranged on the black matrix, the color filter layer is divided by the black matrix into a plurality of color filter blocks arranged in an array, and each of the color filter blocks corresponds to one of the plurality of sub-pixel units.

For example, in the display panel provided by at least one embodiment of the present disclosure, an orthographic projection of the first sub-pixel unit on the first substrate partially overlaps an orthographic projection of the black matrix on the first substrate.

For example, at least one embodiment of the present disclosure provides a display panel, the display panel further comprises liquid crystal filled between the first substrate and the second substrate.

For example, the display panel provided by at least one embodiment of the present disclosure may comprise an alignment film that is coated on a surface of at least one of the first substrate and the second substrate and is in contact with the liquid crystal.

At least one embodiment of the present disclosure provides a display device, the display device comprises any one of the above display panels.

At least one embodiment of the present disclosure provides a manufacture method of the display panel, the method comprises: providing a first substrate and a second substrate; forming a plurality of main spacers between the first substrate and the second substrate to support the first substrate and the second substrate; wherein the display panel is divided into a plurality of sub-pixel units, the plurality of sub-pixel units comprise a plurality of first sub-pixel units and a plurality of second sub-pixel units, the plurality of first sub-pixel units are adjacent to any one of the main spacers and are arranged in a single domain structure, the plurality of second sub-pixel units are not adjacent to any one of the main spacers and are arranged in a multi-domain structure.

BRIEF DESCRIPTION OF THE DRAWINGS

In order to clearly illustrate the technical solution of the embodiments of the disclosure, the drawings of the embodiments will be briefly described in the following; it is obvious

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
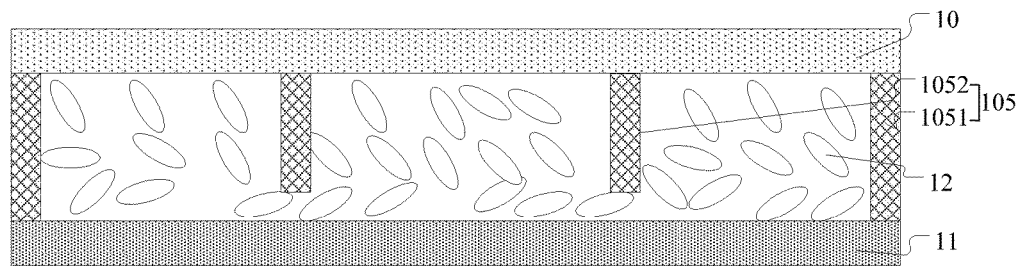
FIG. 1 is a cross-sectional structure schematic diagram of a display panel.
Figure 2:
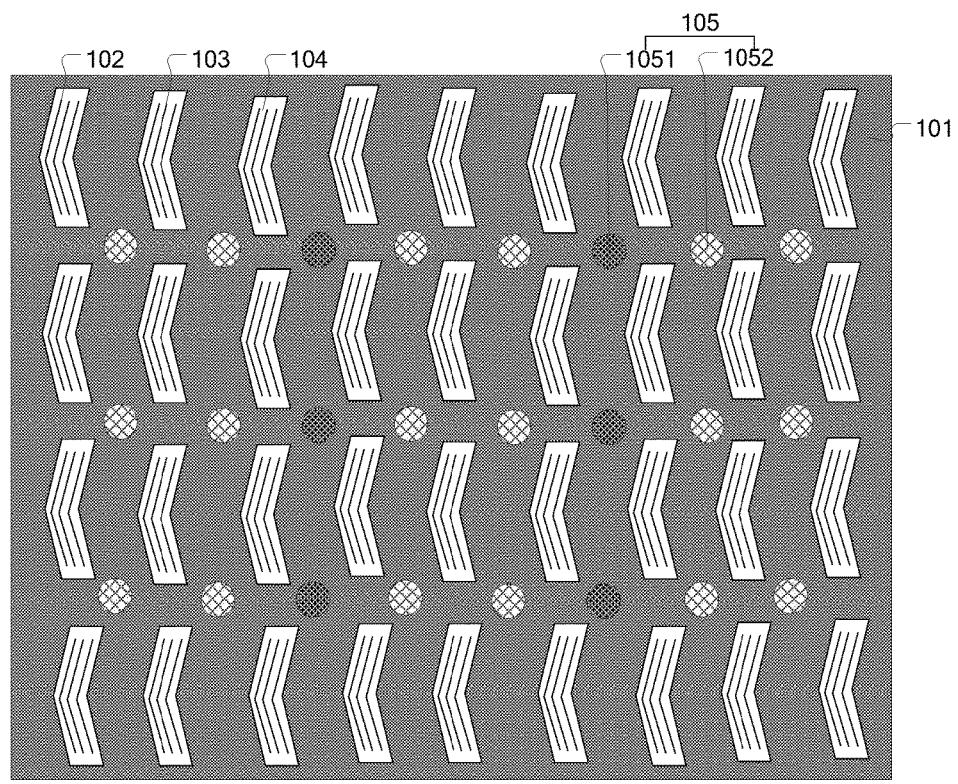
FIG. 2 is a structure schematic top view of the display panel in FIG. 1.
Figure 4:
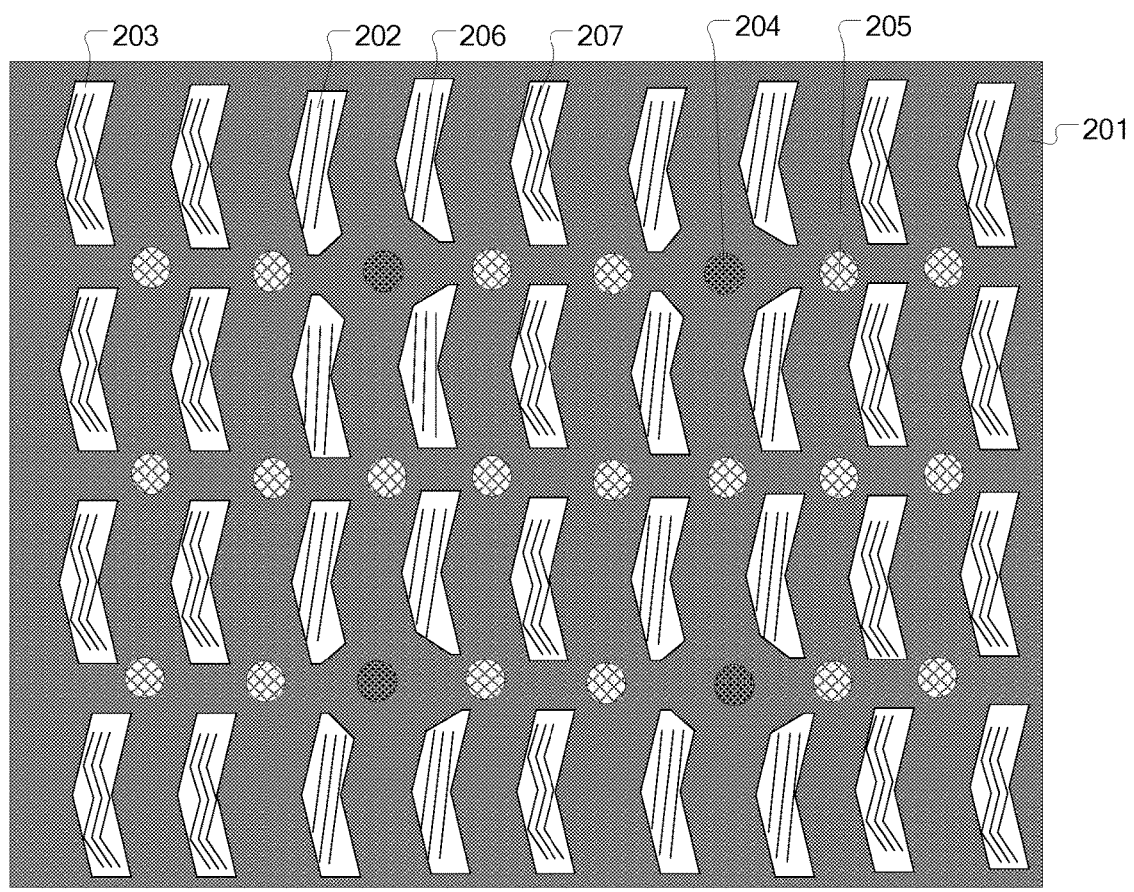
FIG. 4 is a structure schematic top view of a display panel in an embodiment of the present disclosure.
Figure 5:
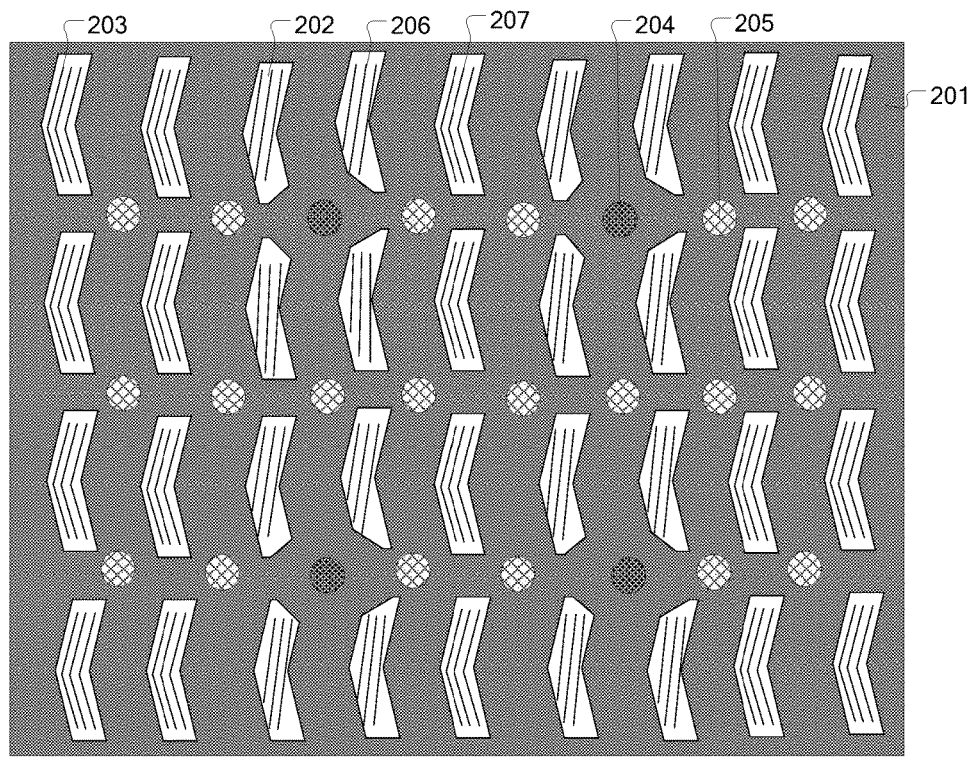
FIG. 5 is a structure schematic top view of a display panel in another embodiment of the present disclosure.

FIG. 1 is a cross-sectional structure schematic diagram of a display panel, for example, the display panel comprises a first substrate 10, a second substrate 11, and liquid crystal 12 filled between the first substrate 10 and the second substrate 11. The first substrate 10 and the second substrate 11 are assembled to each other to form a liquid crystal cell, for example, by a sealant. FIG. 2 is a structure schematic top view of the display panel in FIG. 1, the first substrate 10 in the display panel is, for example, a color filter substrate, and the color filter substrate mainly comprises a black matrix 101, red filter blocks 102, green filter blocks 103, blue filter blocks 104 and a post spacer 105, correspondingly, the second substrate is, for example, an array substrate. The post spacer 105 is divided into a main post spacer 1051 and an auxiliary post spacer 1052. In a state that the first substrate and the second substrate are normally assembled to a cell, the main post spacer 1051 plays a supporting function, and when the display panel is pressed by a large external force, the auxiliary spacer 1052 also has the supporting function. Surfaces of the first substrate 10 and the second substrate 11 that are in contact with the liquid crystal are coated with an alignment film to pre-align liquid crystal molecules. It should be noted that, in FIG. 2, in order to clearly illustrate the red filter blocks, the green filter blocks and the blue filter blocks, for example, a width of the black matrix is showed to be large, but in fact, an area covered by the black matrix is smaller than an area of the pixel region. The width of the black matrix in the following FIG. 3 to FIG. 5 is shown to be large also based on the same consideration.

Figure 3:
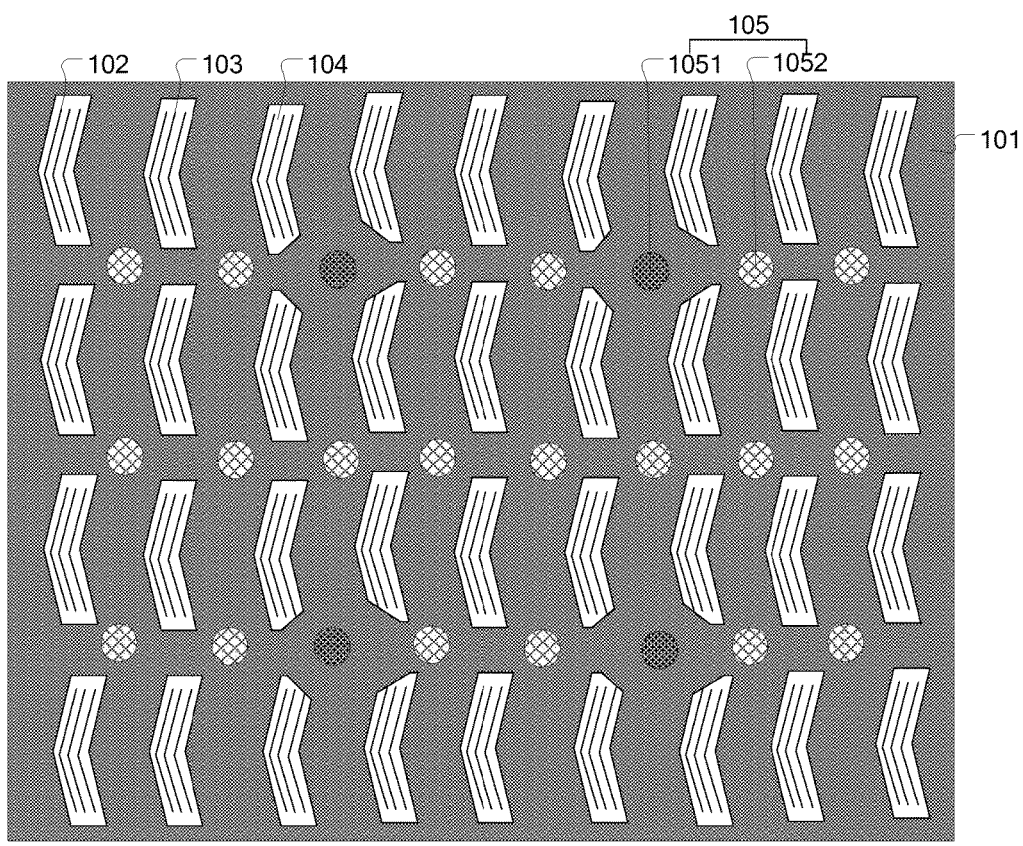
FIG. 3 is a structure schematic top view of another display panel.

In order to avoid the problem of light leakage resulted from the damage of a peripheral alignment film caused by the main post spacer 1051 when the display panel is pressed by a large external force, FIG. 3 provides a structure schematic top view of another display panel, as illustrated in FIG. 3, an orthographic projection of the pixel unit that is adjacent to the main post spacer 1051 on the first substrate overlaps an orthographic projection of the black matrix on the first substrate, that is, a shielding region of the black matrix 101 surrounding the main post spacer 1051 is larger than a shielding region of the black matrix 101 surrounding the auxiliary post spacer 1052, thus, which leads to a part of the black matrix 101 covering a sub-pixel unit that is adjacent to the main post spacer 1051. Therefore, the aperture ratio of the sub-pixel unit surrounding the main post spacer 1051 is smaller than the aperture ratio of the sub-pixel unit surrounding the auxiliary post spacer 1052. Correspondingly, when the same content is displayed, the brightness of the sub-pixel unit surrounding the main post spacer 1051 is lower than the brightness of the sub-pixel unit surrounding the auxiliary post spacer 1052. In order to ensure the thickness uniformity of the liquid crystal cell, the main post spacers are periodically arranged, so that the brightness difference is also periodically distributed, therefore the sub-pixel units with low brightness are connected in a line, finally dark stripes are formed when a colorful picture or a single-color picture are displayed, affecting the quality of the display picture. For example, when the resolution of the display panel is less than 250 PPI (Pixels Per Inch), the brightness of the double-domain sub-pixel unit that are adjacent to the main post spacer is lower than 88% of the brightness of any one of the double-domain sub-pixel units that are not adjacent to the main post spacer 1051, obvious dark stripes are formed when the single-color picture is displayed; the brightness of the double-domain sub-pixel units that are adjacent to the main post spacer is lower than 80% of the brightness of any one of the double-domain sub-pixel units that are not adjacent to the main post spacer 1051, obvious dark stripes are formed when the colorful picture is displayed.

As described above, when the liquid crystal display panel is pressed or slapped by an external force, the spacer is displaced between the first substrate and the second substrate, which damages a peripheral alignment film and therefore leads to light leakage, resulting in the stripe defect caused by the brightness difference of local pixels when a picture is displayed, and the picture quality is poor. As for this problem, embodiments of the present disclosure provide a display panel, the display panel is divided into a plurality of sub-pixel units, the display panel comprises a first substrate and a second substrate that are arranged oppositely, and a plurality of main spacers that are arranged between the first substrate and the second substrate to support the first substrate and the second substrate; the plurality of sub-pixel units comprise a plurality of first sub-pixel units and a plurality of second sub-pixel units, the plurality of first sub-pixel units are adjacent to any one of the main spacers and are arranged in a single-domain structure, and the plurality of second sub-pixel units are not adjacent to any one of the main spacers and are arranged in a multi-domain structure.

For example, the sub-pixel unit in the multi-domain structure comprises a bending region, however electric field in the bending region is disordered, the region may be displayed as a dark region, and the light utilization rate of the liquid crystal is low; the single-domain pixel has no corresponding dark region, the light utilization rate of the liquid crystal in the single-domain pixel region is higher than the light utilization rate of the liquid crystal in the multi-domain pixel region, and the light transmittance in the single-domain pixel region is correspondingly higher than that in the multi-domain pixel region.

In embodiments of the present disclosure, the transmittance of the sub-pixel units is increased by designing the sub-pixel units arranging at periphery of the main spacer as the single-domain structure so as to increase the brightness of the corresponding sub-pixel units to compensate for the brightness loss caused by the decrease of the aperture ratio, therefore effectively preventing the stripe defect and the poor picture quality problems caused by the brightness difference of the local pixels when a colorful picture or a single-color picture is displayed.

At least one embodiment of the present disclosure provides a display panel, the display panel comprises a first substrate and a second substrate that are arranged oppositely, the first substrate and the second substrate are assembled to form a liquid crystal cell by a sealant (not shown) and the liquid crystal cell is filled with liquid crystal. For example, FIG. 4 is a structure schematic top view of a display panel in an embodiment of the present disclosure, a plurality of main spacers 204 are arranged between the first substrate and the second substrate (not shown in the figure) to support the first substrate and the second substrate. The display panel is divided into a plurality of sub-pixel units, and the plurality of sub-pixel units comprise a plurality of first sub-pixel units 202 and a plurality of second sub-pixel units 203, the plurality of first sub-pixel units 202 are adjacent to any one of the main spacers and are arranged in a single-domain structure, and the plurality of second sub-pixel units 203 are not adjacent to any one of the main spacers and are arranged in a multi-domain structure, for example, as illustrated in FIG. 4, the second sub-pixel units 203 is in a four-domain structure. In the embodiment of the present disclosure, the multi-domain structure of the sub-pixel units may be achieved by kinds of structures, and the multi-domain structure may comprise two or more domain regions.

For example, the first substrate is a color filter substrate, and the color filter substrate comprises a first base substrate, a black matrix, a color filter layer, a planarization layer and so on. When the main spacer is arranged on the first substrate (the color filter substrate), the plurality of main spacers are arranged on the black matrix, the color filter layer is divided by the black matrix into a plurality of color filter blocks that are arranged in an array, and each color filter block corresponds to one sub-pixel unit.

For example, the second substrate is an array substrate, and the array substrate comprises a second base substrate, a data line metal electrode, a data line metal electrode insulation layer, a scan line metal electrode, a scan line metal electrode insulation layer, a pixel electrode and so on.

For example, the black matrix is formed in a non-display region that is between the pixel regions of the color filter substrate to shield light of the non-display region, and the black matrix is generally arranged directly opposite to the signal lines on the array substrate, the signal lines comprise data lines and scan lines.

For example, the main spacer 204 is a post spacer (PS) or a ball spacer (BS), the main spacer 204 is formed on the first substrate or the second substrate, or on both the first substrate and the second substrate. In the following, illustration is made by taking a case that the main spacer is arranged on the first substrate and the first substrate is a color filter substrate as an example.

For example, material of the post spacer comprises a transparent UV-curable acrylic resin-based material, and the main material forming the ball spacer comprises melamine resin, urea resin, polystyrene resin and so on.

For example, illustration is made by taking the main spacer being the post spacer as an example, the main spacer is formed on the color filter substrate by a process of exposure, development and so on using a positive photoresist material. For the positive photoresist material, a region of the positive photoresist material which is irradiated by light is removed by a developer after the coated photoresist material is exposed and developed. The process is: forming a black matrix, a color filter, a planarization layer on a side of the color filter substrate and so on, then coating a layer of positive photoresist material, and the main spacer is formed by exposure and development using a patterned mask. For example, the main spacer and the auxiliary spacer may also be formed by one exposure and development using a half-tone or gray-tone mask. For example, the main spacer is arranged directly opposite to the black matrix on the color filter substrate, and the main spacer is arranged under the black matrix.

For example, the first sub-pixel unit 202 comprises a red sub-pixel unit, a green sub-pixel unit and a blue sub-pixel unit. The second sub-pixel unit 203 also comprises a red sub-pixel unit, a green sub-pixel unit and a blue sub-pixel unit.

For example, as illustrated in FIG. 4, the first sub-pixel unit 202 comprises a first electrode 206 that is arranged on the second substrate, the first electrode is a slit-shaped electrode, and the first electrode 206 has slits extending in a same direction; the second sub-pixel unit comprises a second electrode 207 that is arranged on the second substrate, the second electrode is a slit-shaped electrode, and the second electrode 207 has at least two slits extending in different directions. For example, in FIG. 4, the second electrode is in a four-domain electrode structure, and the corresponding second sub-pixel unit has a four-domain structure.

Figure 7:
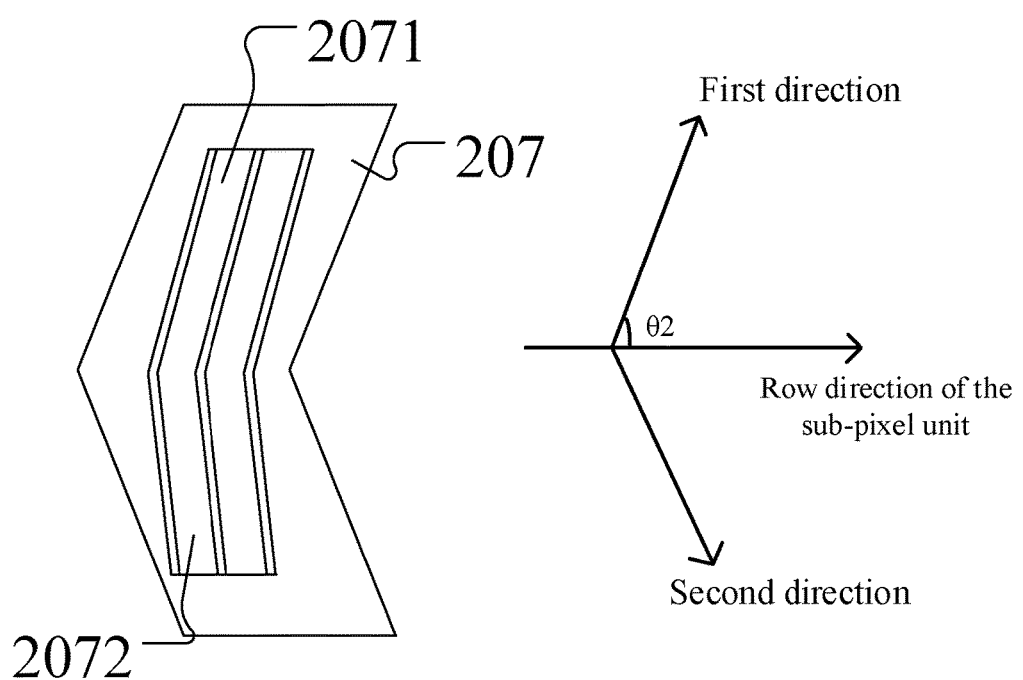
FIG. 7 is a local enlarged structure schematic diagram of a second pixel unit in FIG. 5.

For example, FIG. 5 is a structure schematic top view of a display panel in another embodiment of the present disclosure. As illustrated in FIG. 5, the first electrode 206 has slits extending in the same direction, the first electrode 206 is in a single-domain structure, and the second electrode 207 is in a double-domain structure, FIG. 7 is an enlarged schematic diagram of the second pixel unit in FIG. 5. As illustrated in FIG. 7, the second electrode 207 comprises a first slit 2071 extending in a first direction and a second slit 2072 extending in a second direction. In the power-on state, liquid crystal molecules in the first sub-pixel unit are arranged obliquely in the same direction and the liquid crystal molecules in the second sub-pixel unit are arranged obliquely in two different directions.

Figure 6:
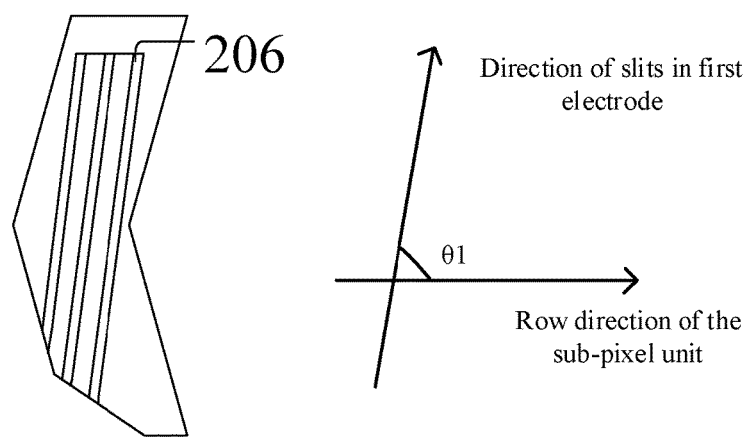
FIG. 6 is a local enlarged structure schematic diagram of a first pixel unit in FIG. 5.

For example, FIG. 6 is a local enlarged structure schematic diagram of the first pixel units in FIG. 5, the first electrode in the first sub-pixel unit comprises a slit, and an angle θ1 between a direction of the slit of the first electrode and a row direction of the sub-pixel unit may range from 80° to 95°, for example, 85°, 90° and 95°.

For example, as illustrated in FIG. 7, as for the second sub-pixel unit, an angle formed by a first direction and the row direction of the sub-pixel unit is equal to an angle formed by a second direction and the row direction of the sub-pixel unit. That is, a first domain and a second domain of the second sub-pixel unit with the double-domain structure form an axisymmetric pattern with an angle bisector as an axis. The angle that is formed by the first direction and the row direction of the sub-pixel unit and the angle that is formed by the second direction and the row direction of the sub-pixel unit may also be unequal to each other.

For example, as illustrated in FIG. 7, an angle θ2 between the first direction and the row direction of the sub-pixel unit may range from 70° to 85°, for example, 70°, 75°, 80°, and 85°.

It should be noted that, in structures that are illustrated in FIG. 4 and FIG. 5, the second sub-pixel unit respectively adopting a two-domain structure and a four-domain structure are merely examples and are not limitative of the present disclosure. The embodiments of the present disclosure are not limited to the structures illustrated in FIG. 4 and FIG. 5, the second electrode may also be in a multi-domain structure, such as a three-domain structure, a five-domain structure and so on.

For example, the first sub-pixel unit 202 further comprises a third electrode that is arranged on the second substrate, and the second sub-pixel unit 203 further comprises a fourth electrode that is arranged on the second substrate.

For example, the third electrode and the fourth electrode may be a plate-shaped electrode or the third electrode and the fourth electrode may be in a slit structure respectively corresponding to the first electrode and the second electrode.

For example, the first electrode and the second electrode are pixel electrodes, the third electrode and the fourth electrode are common electrodes, or the first electrode and the second electrode are common electrodes, and the third electrode and the fourth electrode are pixel electrodes.

For example, when the first electrode and the second electrode are pixel electrodes and the third electrode and the fourth electrode are common electrodes, the pixel electrode that replaces the first electrode may comprise slits extending in a same direction, the pixel electrode that replaces the second electrode may comprise a first slit extending in a first direction and a second slit extending in a second direction, and the common electrode may be a plate electrode or a slit electrode.

For example, when the first electrode and the second electrode are common electrodes and the third electrode and the fourth electrode are pixel electrodes, the common electrode that replaces the first electrode may comprise slits extending in the same direction, the common electrode that replaces the second electrode may comprise a first slit extending in a first direction and a second slit extending in a second direction, and the pixel electrode may be a plate electrode or a slit electrode.

For example, the pixel electrode or the common electrode that replaces the second electrode may respectively form a first domain liquid crystal electric field and a second domain liquid crystal electric field along different directions in every two adjacent rows of sub-pixel unit regions, that is, directions of the liquid crystal electric field formed in every two adjacent rows of sub-pixel unit regions form an angle. Therefore, the light emitting directions in every two adjacent rows of sub-pixel unit regions can compensate each other so that the light mixing effect of the two-domain pixel structure is better and the color-bias is smaller.

For example, material that is used for forming the first electrode, the second electrode, the third electrode and the fourth electrode may be a transparent conductive material, such as indium tin oxide (ITO) and indium zinc oxide (IZO).

For example, the display panel further comprises liquid crystal that are filled between the first substrate and the second substrate. For example, the liquid crystal is cholesteric liquid crystal, nematic liquid crystal, or smectic liquid crystal according to the requirement.

For example, the display panel further comprises an alignment film that is coated on a surface of at least one of the first substrate and the second substrate and is in contact with the liquid crystal. For example, material of the alignment film comprises polystyrene and its derivatives, polyvinyl alcohol, polyester, epoxy, polyurethane, polysilane, polyimide and so on; the alignment film may be subjected to rubbing alignment or photo alignment operation after coated, so that the alignment film may pre-align the liquid crystal molecules.

The display panel in the embodiment of the present disclosure may be widely applied to a fringe field switching (FFS) liquid crystal display, an advanced-super dimensional switching (AD-SDSS, ADS for short) liquid crystal display, and an in-plane switching (IPS) liquid crystal display. Both a common electrode and a pixel electrode of the ADS-type liquid crystal display and the FFS-type liquid crystal display may be arranged on the second substrate (for example, the array substrate). For the FFS technology, by generating an edge electric field between the pixel electrodes in the same plane, the aligned liquid crystal molecules between the electrodes and directly above the electrodes perform rotation conversion in a plane direction, therefore enhancing the light transmission efficiency of the liquid crystal layer. For the ADS technology, by forming a multi-dimensional electric field using parallel electric field generated by an edge of the pixel electrode in the same plane and vertical electric field generated between the pixel electrode layer and the common electrode layer to form, all the aligned liquid crystal molecules between the pixel electrodes in the liquid crystal cell and directly above the electrodes may perform rotation conversion, so that the working efficiency of the plane-aligned liquid crystal can be improved and the light transmission efficiency can be increased.

For example, the plurality of main spacers 204 are periodically arranged, and the periodical arrangement of the main spacers can make a thickness of the liquid crystal cell more uniform and favor to improve the display quality.

For example, as illustrated in FIG. 5, the display panel provided by an embodiment of the present disclosure further comprises a plurality of auxiliary spacers 205 that are spaced apart from the main spacers 204, and a height of the auxiliary spacer 205 is lower than a height of the main spacer 204. In the normal situation, the main spacer 204 has the supporting function. When the liquid crystal cell is pressed by an external press force that is too large to such an extent that the auxiliary spacers 205 abuts on the substrate opposite to it, the auxiliary spacer can play a supporting role.

For example, as illustrated in FIG. 5, an orthogonal projection of the first sub-pixel unit 202 on the first substrate partially overlaps an orthogonal projection of the black matrix 201 on the first substrate. An area of the black matrix 201 covering a peripheral region of the main spacer 204 is larger than an area of the black matrix 201 covering a peripheral region of the auxiliary spacer 204. The color filter block at a position adjacent to the main spacer 204 has a chamfered structure compared with other color filter blocks (a corner of the color filter block that is adjacent to the main spacer is covered by the black matrix to form the chamfered structure), and the chamfered structure faces the main spacer 204, which is equivalent to prolonging a distance between the first sub-pixel unit 202 and the main spacer 204, so as to reduce light leakage risk caused by the damage of the alignment layer when the external press force is too large, but the aperture ratio of the first sub-pixel unit 202 arranging at a periphery of the main spacer 204 is smaller than the aperture ratio of the second sub-pixel unit 203 arranging at a periphery of the auxiliary spacer 205. When the first sub-pixel unit and the second sub-pixel unit are turned on, the brightness of the first sub-pixel unit 202 arranging at a periphery of the main spacer 204 is lower than the brightness of the second sub-pixel unit 203 arranging at a periphery of the auxiliary spacer 205. As illustrated in FIG. 5, when the first sub-pixel unit 202 that is adjacent to the main spacer 204 is designed as a single-domain pixel structure, the transmittance of the first sub-pixel unit 202 can be increased, so that the brightness of the corresponding first sub-pixel unit 202 can be increased to compensate for the brightness loss caused by the decrease of the aperture ratio, effectively preventing the stripe defect caused by the brightness difference of the local pixels when a colorful picture or a single-color picture is displayed, and improving the picture display quality.

At least one embodiment of the present disclosure provides a display device, the display device comprises any of the above display panels, and other structures in the display device may refer to the conventional design. The display device, for example, may be any product or component with displaying function, such as a mobile phone, a tablet computer, a television, a display, a notebook computer, a digital photo frame, a navigator and so on.

At least one embodiment of the present disclosure provides a manufacture method of the display panel, the method comprises: providing a first substrate and a second substrate; forming a plurality of main spacers between the first substrate and the second substrate to support the first substrate and the second substrate; the display panel is divided into a plurality of sub-pixel units, the plurality of sub-pixel units comprise a plurality of first sub-pixel units and a plurality of second sub-pixel units, the plurality of first sub-pixel units are adjacent to any one of the main spacers and are arranged in a single domain structure, the plurality of second sub-pixel units are not adjacent to any one of the main spacers and are arranged in a multi-domain structure.

For example, the first substrate is a color filter substrate, and the color filter substrate comprises a first base substrate, a black matrix, a color filter layer, a planarization layer and so on. When the main spacer is arranged on the first substrate (the color filter substrate), the plurality of main spacers are arranged on the black matrix, the color filter layer is divided by the black matrix into a plurality of color filter blocks that are arranged in an array, and each color filter block corresponds to one sub-pixel unit.

For example, the second substrate is an array substrate, and the array substrate comprises a second base substrate, a data line metal electrode, a data line metal electrode insulation layer, a scan line metal electrode, a scan line metal electrode insulation layer, a pixel electrode and so on.

For example, the main spacer is a post spacer, the main spacer is formed on the color filter substrate by a process of exposure, development and so on using a positive photoresist material. For the positive photoresist material, a region of the positive photoresist material which is irradiated by light is removed by a developer after the coated photoresist material is exposed and developed. The process is: forming a black matrix, a color filter, a planarization layer on a side of the color filter substrate and so on, then coating a layer of positive photoresist material, and the main spacer is formed by exposure and development using a patterned mask. For example, the main spacer and the auxiliary spacer may also be formed by one exposure and development using a half-tone or gray-tone mask. For example, the main spacer is arranged directly opposite to the black matrix on the color filter substrate, and the main spacer is arranged under the black matrix.

For example, the first sub-pixel unit comprises a first electrode that is arranged on the second substrate, the first electrode has slits extending in a same direction, the second sub-pixel unit comprises a second electrode that is arranged on the second substrate, the second electrode has at least two slits extending in different directions.

For example, the first sub-pixel unit further comprises a third electrode that is arranged on the second substrate, and the second sub-pixel unit further comprises a fourth electrode that is arranged on the second substrate.

For example, the third electrode and the fourth electrode may be plate-shaped electrodes or the third electrode and the fourth electrode may be in a slit-shaped structure respectively corresponding to the first electrode and the second electrode.

For example, the first electrode and the second electrode are pixel electrodes, the third electrode and the fourth electrode are common electrodes, or the first electrode and the second electrode are common electrodes, and the third electrode and the fourth electrode are pixel electrodes.

For example, the manufacture method further comprises forming a plurality of auxiliary spacers that are spaced apart from the main spacers, and a height of the auxiliary spacer is lower than a height of the main spacer. The manufacture method of auxiliary spacer may refer to the manufacture method of the above mentioned main spacers.

The display panel and the manufacture method thereof, the display device provided by the embodiments of the present disclosure at least have the following beneficial effects:

(1) In the display panel provided by at least one embodiment of the disclosure, the transmittance of the first sub-pixel unit is improved by designing the first sub-pixel unit at a periphery of the main post spacer as a single-domain structure.

(2) The display panel provided by at least one embodiment of the disclosure can increase the brightness of the first sub-pixel unit, so as to compensate for the brightness loss caused by the decrease of the aperture ratio.

(3) The display panel provided by at least one embodiment can effectively prevent the stripe defect and the poor picture quality problem caused by the brightness difference of the local pixels when a colorful picture or a single-color picture is displayed.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged, that is, the accompanying drawings are not drawn according to the actual scale. However, it should understood that, in the case in which a component or element such as a layer, film, region, substrate or the like is referred to be "on" or "under" another component or element, it may be directly on or under the another component or element or a component or element is interposed therebetween.

(3) In case of no conflict, features in one embodiment or in different embodiments can be combined.

What are described above is related to the specific embodiments of the disclosure only and not limitative to the scope of the disclosure. The protection scope of the disclosure shall be based on the protection scope of the claims.

The present application claims priority to the Chinese patent application No. 201611091735.5, filed Dec. 1, 2016, the entire disclosure of which is incorporated herein by reference as part of the present application.

The invention claimed is:

1. A display panel, divided into a plurality of sub-pixel units, and comprising:
   a first substrate and a second substrate, arranged opposite to each other,
   a plurality of main spacers, arranged between the first substrate and the second substrate to support the first substrate and the second substrate;
   wherein the plurality of sub-pixel units comprise a plurality of first sub-pixel units and a plurality of second sub-pixel units, the plurality of first sub-pixel units are adjacent to any one of the main spacers and are arranged in a single-domain structure, and the plurality of second sub-pixel units are not adjacent to any one of the main spacers and are arranged in a multi-domain structure.

2. The display panel according to claim 1, wherein the first sub-pixel unit comprises a first electrode that is arranged on the second substrate, the first electrode comprises slits that extend in a same direction, and the second sub-pixel unit comprises a second electrode that is arranged on the second substrate, the second electrode comprises at least two slits that extend in different directions.

3. The display panel according to claim 2, wherein the second electrode is in a double-domain structure, the second electrode comprises a first slit that extends in a first direction and a second slit that extends in a second direction, an angle formed by the first direction and a row direction of the sub-pixel unit is equal or unequal to an angle formed by the second direction and the row direction of the sub-pixel unit.

4. The display panel according to claim 3, wherein the angle formed by the first direction and the row direction of the sub-pixel unit is in a range of 70°-85°.

5. The display panel according to claim 2, wherein the first sub-pixel unit further comprises a third electrode that is arranged on the second substrate; and the second sub-pixel unit further comprises a fourth electrode that is arranged on the second substrate.

6. The display panel according to claim 5, wherein the first electrode and the second electrode are pixel electrodes, the third electrode and the fourth electrode are common electrodes; or, the first electrode and the second electrode are the common electrodes, and the third electrode and the fourth electrode are the pixel electrodes.

7. The display panel according to claim 1, wherein the plurality of main spacers are periodically arranged.

8. The display panel according to claim 1, further comprising a plurality of auxiliary spacers that are spaced apart from the main spacers, and a height of the auxiliary spacer is lower than a height of the main spacer.

9. The display panel according to claim 1, wherein a color filter layer and a black matrix are further arranged on the first substrate, the plurality of the main spacers are arranged on the black matrix, the color filter layer is divided by the black matrix into a plurality of color filter blocks arranged in an array, and each of the color filter blocks corresponds to one of the plurality of sub-pixel units.

10. The display panel according to claim 9, wherein an orthographic projection of the first sub-pixel unit on the first substrate partially overlaps an orthographic projection of the black matrix on the first substrate.

11. The display panel according to claim 6 comprising liquid crystal filled between the first substrate and the second substrate.

12. The display panel according to claim 11, further comprising an alignment film that is coated on a surface of at least one of the first substrate and the second substrate and is in contact with the liquid crystal.

13. A display device, comprising the display panel according to claim 1.

14. A manufacture method of the display panel, comprising
   providing a first substrate and a second substrate;
   forming a plurality of main spacers between the first substrate and the second substrate to support the first substrate and the second substrate;
   wherein the display panel is divided into a plurality of sub-pixel units, the plurality of sub-pixel units comprise a plurality of first sub-pixel units and a plurality of second sub-pixel units, the plurality of first sub-pixel units are adjacent to any one of the main spacers and are arranged in a single domain structure, the plurality of second sub-pixel units are not adjacent to any one of the main spacers and are arranged in a multi-domain structure.

15. The display panel according to claim 2, further comprising a plurality of auxiliary spacers that are spaced apart from the plurality of main spacers, and a height of the auxiliary spacer is lower than a height of the main spacer.

16. The display panel according to claim 3, further comprising a plurality of auxiliary spacers that are spaced apart from the plurality of main spacers, and a height of the auxiliary spacer is lower than a height of the main spacer.

17. The display panel according to claim 4, further comprising a plurality of auxiliary spacers that are spaced apart from the plurality of main spacers, and a height of the auxiliary spacer is lower than a height of the main spacer.

18. The display panel according to claim 5, further comprising a plurality of auxiliary spacers that are spaced apart from the plurality of main spacers, and a height of the auxiliary spacer is lower than a height of the main spacer.

19. The display panel according to claim 6, further comprising a plurality of auxiliary spacers that are spaced apart from the plurality of main spacers, and a height of the auxiliary spacer is lower than a height of the main spacer.

* * * * *